Figure 1A:
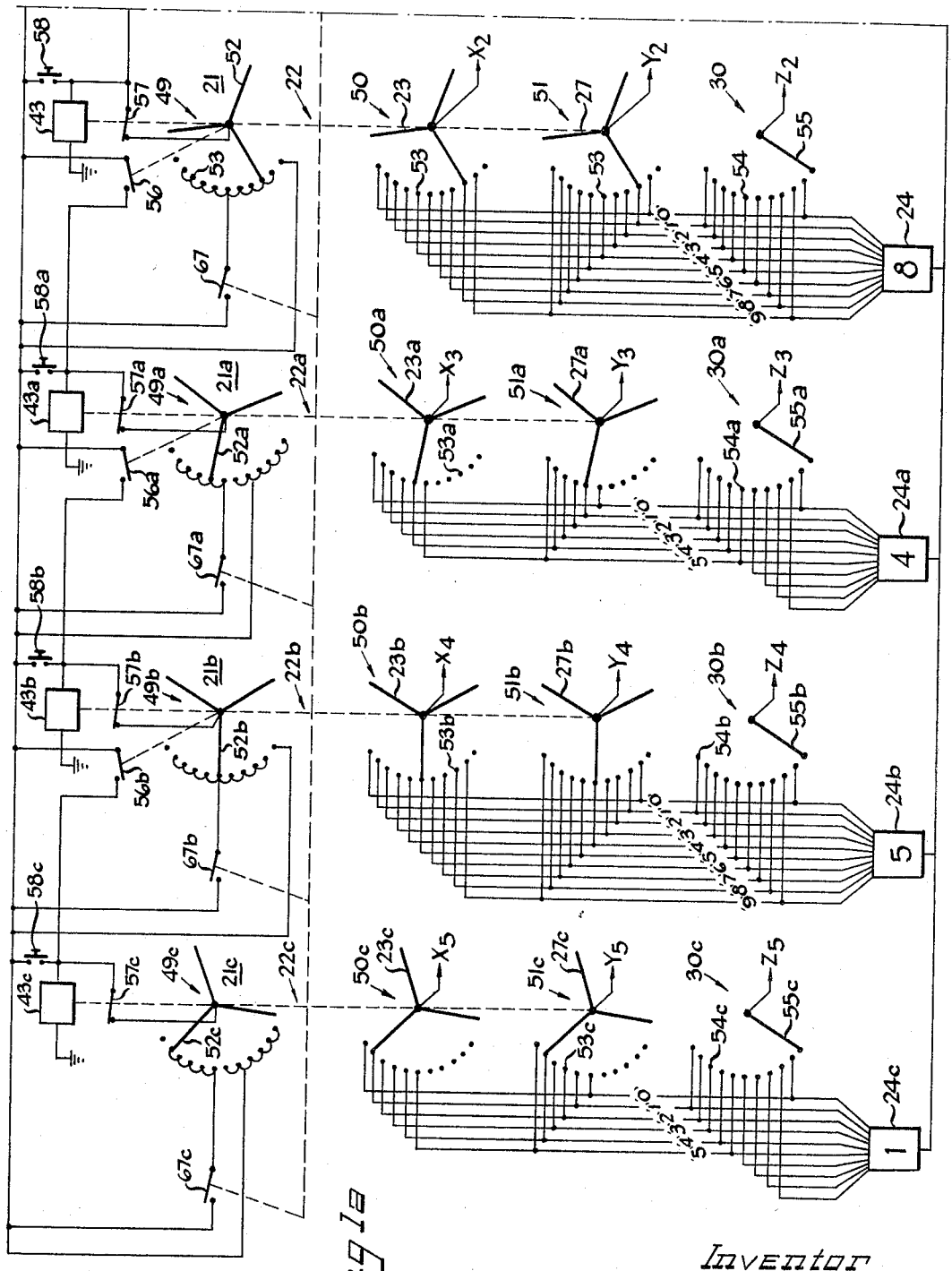

Nov. 8, 1966
J. B. NOBLES
3,284,790
ELECTRICAL TIMING CIRCUIT
Filed June 4, 1964
2 Sheets-Sheet 2
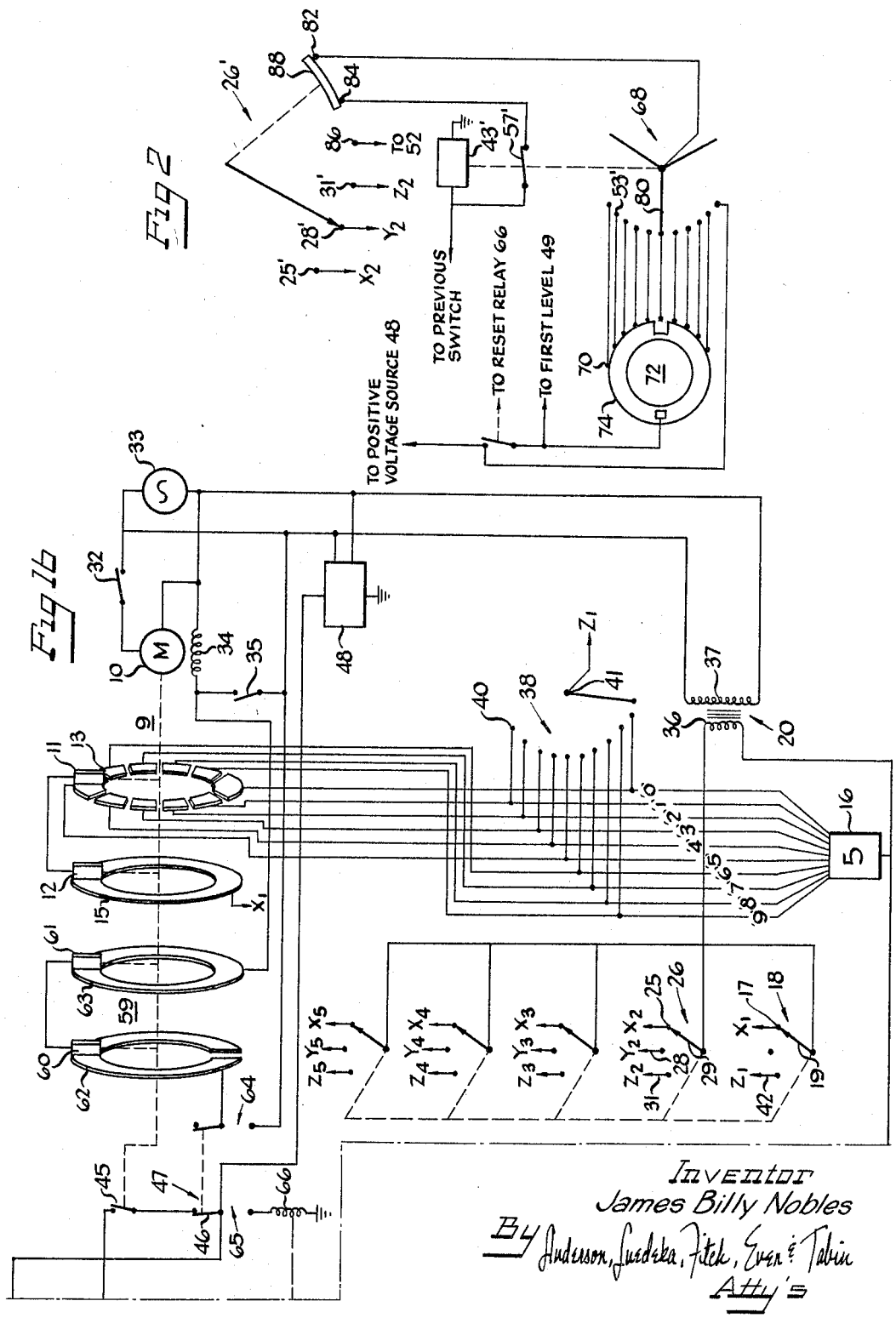
Inventor
James Billy Nobles
By Anderson, Luedeka, Fitch, Even & Tabin
Atty's

United States Patent Office 3,284,790
Patented Nov. 8, 1966

3,284,790
ELECTRICAL TIMING CIRCUIT
James Billy Nobles, 1540 Maple Ave., Northbrook, Ill.
Filed June 4, 1964, Ser. No. 372,487
8 Claims. (Cl. 340—309.4)

This invention relates to electrical timing devices and more particularly to electrical timing circuits providing digital displays.

Existing electrical timing circuits which display their results in digital form have certain disadvantages and have been limited in their use because of a lack of versatility. Often, for example, the particular digit displayed cannot be easily selected. In addition, such timing circuits usually have been limited to a single mode of operation (i.e., operation either to display elapsed time or to display the remaining time).

It is an object of this invention to provide an improved electrical timing circuit. It is another object to provide a versatile electrical timing circuit. It is yet another object to provide an electrical timing circuit capable of operating in alternate modes. It is still another object to provide an electrical timing circuit capable of easily providing a selected forward and reverse sequence of digital displays.

These and other objects of the present invention will become apparent by reference to the following description and accompanying drawings wherein:

FIGURES 1a and 1b are schematic diagrams, partially in block form, of one preferred embodiment of a timing circuit; and FIGURE 2 is a modification of a portion of the circuit of FIGURE 1.

The illustrated timing circuit provides any one of three types of display, i.e., a display of elapsed time, a countdown display or a display of a selected time. To facilitate an understanding of the illustrated timing circuit hereinafter described in more detail, a brief outline of a typical operating cycle is first set forth. The operation of the circuit is initiated by energizing a time base timer circuit 9 which includes a synchronous motor 10 having a pair of electrically interconnected brushes 11 and 12 connected to the shaft thereof. The brushes 11 and 12 rotate in contact respectively with a fixed segment conductive ring 13 and a continuous conductive ring 15. The inputs of a first digital, electro-optical read-out unit 16 are respectively connected to the segments of the segmented ring 13. The continuous ring 15 is connected through one terminal 17 of a first, operating mode selector switch 18 to a voltage source 20. Thus, as the brushes 11 and 12 rotate, the segments successively connect the inputs to the voltage source 20. At the end of each revolution of the brushes 11 and 12, not only is the display of digits repeated, but a pulse is transmitted to a first of a series of generally similar counter circuits 21. The first counter circuit 21 includes a stepping switch 22 which is caused to step forward one position by each pulse applied thereto. At each position of the stepping switch 22, a first rotating contact 23, associated therewith connects one input of a second read-out unit 24 associated with the stepping switch 21 to the voltage source 20 through one terminal 25 of a second mode selector switch 26. As the stepping switch 22 is advanced, the inputs are connected to the voltage source 20 in a forward sequence.

A second rotating contact 27 asociated with the stepping switch 22 is arranged so as to connect the inputs of the read-out 24 through a second terminal 28 of the second mode selector switch 26 to the voltage source 20 in reverse sequence. Individual inputs are selected by a manually operated preset switch 30 which connects the inputs to the voltage source 20 through a third terminal 31 on the second selector switch 26. Thus, for each position of the selector switch 26, one of the rotating contacts 23 or 27 on the stepping switch 21 or the manually operated preset switch 30, is connected to the voltage source 20. Successive counter circuits are each similarly arranged and are energized, thereby advancing one step, when the immediately preceding counter circuit completes one cycle of operation.

More specifically, the illustrated timing circuit employs the synchronous motor 10 as the time base timer. In this connection, the synchronous motor 10 is connected through a power switch 32 to an alternating current power source 33. The synchronous motor 10 is energized upon closure of the power switch 32, its speed being governed by the frequency of the A.-C. signal and, in the illustrated embodiment, is designed to complete a revolution 60 times per minute. The motor 10 is provided with an electrical brake (not shown), the energizing coil 34 of which is connected through a start-stop switch 35 to the A.-C. power source 33. The brake prevents the motor 10 from rotating until the brake coil 34 is energized by closure of the start-stop switch 35. This insures that the brushes 11 and 12 start and stop rotation at the desired instant.

In the illustrated embodiment, the pair of electrically interconnected contact brushes 11 and 12 are mechanically coupled to the output shaft of the motor 10. The contact brushes 11 and 12 are respectively positioned to rotate in contact with the segmented conductive ring 13 and the continuous conductive ring 15. Conveniently, the rings may be concentrically arranged on an insulating board (not shown) and may be formed by printed circuit techniques.

The individual inputs of the first digital electro-optical read-out unit 16 are each connected to one segment of the segmented ring 13 in ascending order (i.e., "0" to "9"). In the illustrated embodiment, the segmented ring 13 is provided with ten (10) segments. Thus, since the brushes 11 and 12 make one revolution per second, each digit of the read-out unit 16 indicates a tenth (0.1) of a second.

Energizing power for the read-out unit 16 is provided by the power source 20 which is a step down transformer. One end of the secondary winding 36 of the step down transformer 20 is connected to the common of the read-out unit 16 and the other end of the secondary winding 36 is connected to the common contact of the first, operating mode selector switch 18. The illustrated first, mode selector switch is one bank of a ganged rotary switch. The first terminal 17 of the first, mode selector switch 18, connected to the common contact through movable contact 19, is coupled to the continuous ring 15, thereby completing the circuit to the read-out unit 16. The primary winding 37 of the step down transformer 20 is coupled to the A.-C. power source 33.

In the illustrated embodiment, the individual inputs of the tenth's read-out 16 are manually selected by a rotary preset selector switch 38. In this connection, the individual inputs of the input of the read-out 16 are connected to the terminals 40 of the preset switch 38 and the common terminal 41 is connected to a third terminal 42 of the first, mode selector switch 18. Thus, by changing the position of the movable contact 19 of the mode selector switch 16, the display shows elapsed time or a preset time.

The synchronous motor 10 continues to rotate as long as power is applied thereto and the brushes are rotated as long as the brake coil 34 is energized (i.e., brake deactivated). Each time the brushes 11 and 12 make one complete revolution, thereby indicating a time interval of 1 second, a pulse is transmitted to the succeeding counter circuit 21 which indicates unit seconds. The counter circuit includes the stepping switch 22 which is a conventional pulse operated three level type which is stepped each time the brushes 11 and 12 make a complete revolution. In this connection, one side of a solenoid 43, which operates the stepping switch 22, is coupled through a normally open cam operated switch 45 and through a normally closed contact 46 of a reset switch 47 (described more fully hereinafter) to one terminal of a suitable source 48 of direct current, such as a rectifier coupled to the A.-C. power source 33. The other side of the solenoid 43 as well as the other terminal of the D.-C. source 48, is grounded. The cam (not shown) of the cam operated switch 45 is rotated by the motor 10 and is arranged to close the switch 45 each time the brushes 11 and 12 make a complete revolution. The illustrated stepping switches are advanced one step each time the solenoid is de-energized, e.g., the opening of the cam operated switch 45. Thus, the stepping switch 22 is advanced one position, each time the brushes 11 and 12 complete a revolution.

As previously indicated, the illustrated stepping switch 22 has three levels of contacts, 49, 50 and 51. Each level includes a three bladed wiping arm 52, 23 and 27, respectively, and a series of contact points 53, eleven in the illustrated embodiment, which are successively contacted by each blade of the wiping arms 52, 23 and 27. The wiping arms 52, 23 and 27 are mechanically linked and all advance one step simultaneously each time the solenoid 43 is de-energized. The points 53 and wiping arm blades 52, 23 and 27 of each level are arranged so one and only one contact point 53 on each level is engaged by a wiping arm blade 52, 23 and 27 at the end of each step and the points 53 located at corresponding positions on each level are engaged simultaneously.

In the illustrated embodiment, the first ten pulses received by the solenoid 43 result in each wiping arm 52, 23 and 27 being stepped from the first contact point to the tenth contact point. The second level 50 is employed to count forward and the third level 51 is employed to count backward. In this connection, the inputs of the second read-out 24 which indicates seconds, are connected in forward sequence to the contact points of the second level 50 and the inputs are connected in reverse sequence to the contact points of the third level 51.

The second read-out unit 24 is energized by connecting one side of the secondary winding 36 of the step down transformer 20 to the common input of the read-out unit 24 and connecting the other side of the second winding 36 to the common terminal of the second, mode selector switch 26. The mode selector switch 26 is provided with a plurality of fixed terminals, 25, 28 and 31, three being shown, each located at different positions and adapted to be selectively engaged by a movable contact 29. The first terminal 25 of the mode selector switch 26 is connected to the wiping arm 23 of the second level 50, and the second terminal 28 is connected to the wiping arm 27 of the third level 51.

To permit a display of a specific digit on the seconds read-out unit 24, the inputs of the read-out unit 24 are connected to the individual contact points 54 of the manually operated preset switch 30. The moving contact 55 of the preset switch 30 selectively connects the contact points 54 to the third terminal 31 on the mode selector switch 26. When the movable contact 29 of the mode selector switch 26 is in its third position, the read-out units are connected to the step down transformer 20 through the preset switch 30.

In the illustrated embodiment the eleventh contact position of the stepping switch 22 is employed to actuate a succeeding or second counting circuit 21a which is substantially of the same construction as the first counter circuit 21. Similar parts of the second counter circuit are identified hereinafter with the same reference numeral with the subscript "a." More specifically, as a corresponding blade of the wiping arms 52, 23 and 27 on each level 49, 50 and 51, respectively, engages the eleventh contact, a pulse is transmitted to the second counter circuit 21a and at the same time the solenoid 43 of the first stepping switch 22 is immediately energized and de-energized to advance the stepping switch 22 of the first counter circuit 21 one step. The pulse is transmitted to the second counter circuit 21a by the closing of a normally open switch 56, the switch 56 being actuated by a cam (not shown) mechanically coupled to the wiping arms. The switch 56 is connected in series with the solenoid 43a of the second counter circuit 21a and the D.-C. power supply 48. The solenoid 43a of the second stepping switch 22a is thereby energized through the closing of the normally open switch 56 and operates in an identical manner as did the solenoid 43 of the first stepping switch 22 explained hereinabove.

As previously indicated, the first solenoid 43 is immediately energized when the first level wiping arm blade 52 engages the eleventh contact point. In this connection, the solenoid 43 is coupled through a first interrupter switch 57, the wiping arm 52 and the eleventh contact 53 to the D.-C. power supply 48. The interrupter switch 57 is opened by the energization of the solenoid 43, thereby de-energizing the solenoid and causing the wiping arms 52, 23 and 27 to advance an additional step. The first contact point 53 on each level 49, 50 and 51 is therefore engaged by the next succeeding wiping arm blade 52, 23 and 27, and the normally open switch 56 is released, thereby de-energizing the second solenoid 43a causing the second stepping switch 22a to advance one step.

In the illustrated embodiment, during a countdown mode of operation the display may be preset at any specific digit by operating a push button 58. The push button 58, when depressed, connects the D.-C. power supply 48 to the solenoid 43. Release of the push button 58 causes the stepping switch 22 to advance one step.

The illustrated counter circuit 21 and the timer circuit 9 are reset to zero by depressing the reset switch 47 which is a two positioned-two pole, spring return reset switch. The closing of the reset switch 47 energizes the brake coil 33 through a zero indicating circuit 59 which insures that the timer circuit resets to zero (i.e., "0" is the first digit displayed after a reset mode). The zero indicating circuit 59 includes a pair of electrically interconnected brushes 60 and 61 carried by the motor shaft, and a pair of conductive rings 62 and 63, one of which is provided with a discontinuity corresponding to the position of the zero segment on the segmented ring 13 and the other of which is continuous. One side of the start-stop switch 35 is connected to the continuous ring 63. The other side of the start-stop switch 35 is connected to the discontinuous ring 62 through a first pole 64 and normally open contact of the reset switch 47. Thus, the start-stop switch 35 is by-passed by depressing the reset switch 47, thereby energizing the brake coil 33 and rendering the brake inactive. As a result, the brushes 60 and 61 rotate until the discontinuity in the discontinuous ring 62 is reached, at which point the reset circuit is opened and the brake de-energized.

The counter circuit 21 is reset to zero by connecting the solenoid repeatedly to the D.-C. power source 48. In this connection, when the reset switch 47 is depressed, the second pole 65 connects the output of the D.-C. power supply 48 to a reset relay 66, the energization of which reset relay causes the stepping switches to reset. More specifically, a first normally open contact 67 of the reset relay 66 closes and connects the second through tenth contact points 53 of the first level 49 to the D.C. power supply 48. As a result, the solenoid 43 is energized through one of the contacts 53, the wiping arm 52, and the interrupter switch 57. The interrupter switch 57 then opens and breaks the circuit de-energizing the solenoid 43, thereby causing the stepping switch 22 to advance one step. This process is repeated until the wiping arm blades 52, 23 and 27 engage the first contact point 53 on each level 49, 50 and 51, respectively. The first contact of the first level 49 is not connected to the power supply and hence stepping of the switch 22 ceases.

As previously indicated, each of the counter circuits is of similar construction, and hence will not be described in detail. In the illustrated embodiment, four counter circuits 21, 21a, 21b and 21c are provided to show time in minutes and seconds, the timer circuit 9 showing the time in tenths of a second. Similar parts on the counters are indicated with the same reference numeral, subscript "a" for the ten-second counter, the subscript "b" for the minute counter and the subscript "c" for the ten-minute counter. The second and third level of the ten-second counting circuit 21a and the ten-minute counting circuit 21c are only provided with the five display positions to provide the necessary zero display after 59 minutes and 59 seconds respectively. The sixth to eleventh contact points 53 of these counters 21a and 21c are connected to the D.C. voltage source 48 to provide reset after the digit five (5) is displayed.

When the timing circuit is reset as described above, it is ready for operation. Operation thereof is initiated by closing the start-stop switch 35. The brushes 11 and 12, being driven at 1 r.p.s. successively connect the inputs of the first read-out unit 16 to the step down transformer 20 through the segmented printed circuit ring 13 and the continuous ring 15. As a result, assuming that the movable contact 19 of selector switch 18 is in the forward sequence position (as shown), the digits "0"–"9" are each successively displayed by the first read-out unit 16 for one-tenth of a second.

The first stepping switch solenoid 43 receives a D.C. pulse every second, i.e., upon completion of each revolution of the brushes 11 and 12, through the momentarily closed cam switch 45 and the normally closed contacts 46 of the reset switch 47. As the cam switch 45 opens, de-energizing the solenoid 43, the wiping arms 52, 23 and 27 of the first stepping switch 22 are advanced one step from the first contact points 53 on each level 49, 50 and 51, respectively to engage the second contact points 53. Since the second level wiping arm 23 is connected to the transformer through the selector switch 26 when the movable contact 29 is in its first position, the digit "1" is displayed on the second read-out unit 24. Each second, i.e., for every pulse received by the solenoid 43, the next succeeding digit is displayed as the stepping switch wiper arms 52, 23 and 27 advance to engage successive contact points 53.

The stepping of the switch from the tenth to eleventh contact points 53, however, initiates functions which do not occur during the other steps. At this time the first level wiper arm blade 52 that is about to engage the first contact 53 closes the normally open switch 56 to energize the solenoid 43a of the second stepping switch 22a by connecting it to the B+ output of the power supply 48. As the preceding blade of the first wiper arm 52 reaches the eleventh contact point 53, which is directly connected to the B+ source 48, the first solenoid 43 is energized through the circuit including the eleventh contact point 53, the wiper arm 52 and the interrupter switch 57. The energized solenoid 43 opens the interrupter switch 57, breaking the energizing circuit, thereby de-energizing the solenoid 43 and advancing the stepping switch 22 an additional step. The succeeding blade of each wiper arm 52, 23 and 27 now engages the first contact point 53 on each level 49, 50 and 51, respectively.

As the wiper arm blades 52, 23 and 27 advance to the first contact point 53, the normally open switch 56 is released, de-energizing the second solenoid 43a and causing the second stepping switch 22a to advance one step. The inputs of the second read-out unit 24, connected to the step down transformer 20 through the second level 50, are connected so that the digits are displayed in ascending order.

If it is desired to operate in the countdown mode rather than using the timing circuit as an interval timer, it is only necessary to move the movable contacts of selector switches from the first to the second position.

When circuit operation is now initiated, operation of the stepping switches 22, 22a, 22b and 22c is identical as before with the exception that the read-out units 24, 24a, 24b and 24c are connected to the transformer 20 through the third levels 27, 27a, 27b and 27c. Thus, as the stepping switches 22, 22a, 22b and 22c are advanced from one position to the next the digits are displayed in descending rather than ascending order.

If a fixed or stationary display is desired, e.g., the record for an event being timed, the movable contacts of selector switches are moved to the third position. The read-out units 16, 24, 24a, 24b and 24c are, therefore, connected to the transformer 20 through the present switches 30, 30a, 30b, 30c and 38 which may be manually operated to energize any desired display.

Referring to FIGURE 2, there is shown a modification of a portion of the timing circuit which allows selective "homing" of the stepping switches when the selector switch 26' is in the countdown mode. As shown, the individual contact points 53' on a fourth level 68 of each stepping switch 22', only one being shown, are connected to the individual contacts 70 of a supplemental homing switch 72. A movable shorting contact 74 on the homing switch 72 is operable to short all contacts 53', 70 together except for one contact on each switch 68, 72. The shorting contact 74 is connected to one terminal 76 of the normally open reset relay operated switch 67', the other terminal 78 of which is connected to the B+ output of the power supply 48.

In this modification, as shown, the wiping arm 80 on the fourth level 68 is connected to a first of three additional terminals 82 on the first bank of the selector switch 26'. One terminal of the interrupter switch 57', the other being connected to the solenoid 43', is connected to the second additional terminal 84 on the selector switch 26'. The wiping arm 52 of the first level 49 is connected to the third additional terminal 86 as indicated in the embodiment of FIGURE 2 instead of directly to the interrupter switch 57 as shown in FIGURE 1a. When the selector switch 26' is in its second position (as shown) a movable conductive segment 88 mechanically linked to the movable wiper 29' bridges the first and second additional terminals 82 and 84. When the movable wiper 29' is in its first position, the conductive segment 88 bridges the second and third additional terminals 84 and 86.

This modification results in the ability of the timing circuit, when in its countdown mode, to be reset to any desired starting display. The digit displayed on each read-out unit 24, 24a, 24b and 24c when the reset switch 47 is depressed is determined by the position of the associated supplemental homing switch 72. When the reset relay 66 is energized, each stepping switch will continue to advance until the wiping arm 80 engages that contact point 53' on the fourth level 68 connected to the unshorted contact 70 of the supplemental homing switch 72. Since, as explained previously, this terminal is not connected to B+ power source 48, the stepping switch 22' ceases to advance. In forward timing, the movable contact 29' of the mode selector switch 26', being in its first position, contacts terminal 25' as explained hereinbefore and the conductive segment 88 bridges extra terminals 84 and 86. As a result, the first level 49 rather than fourth level 68 is connected to the solenoid 43' through the interrupter switch 57'. The homing switch 72 is thereby rendered inoperative during the forward mode of operation.

If desired, digits may be displayed for one-tenth of a second in the countdown mode by utilizing two additional printed circuit rings analogous to the first two printed circuit rings 13 and 15. These rings, bridged by a pair of interconnected brushes would be connected between the first read-out unit 16 and the second terminal 90 on the first, mode selector switch 18. The additional segmented ring would be connected to the inputs of the first readout unit in a reverse order from the first segmented ring 13. In addition, selective homing of the motor may be accomplished by modifying of the motor may be accomplished by modifying the conductive ring 62. This ring may be divided into ten segments, each of which would be connected to the contacts of a homing switch which may be similar to the switch 72 shown in FIGURE 2.

While only one set of preset switches has been shown, additional switches can be readily provided. The wiper of each such additional switch would be connected to an additional terminal on each selector switch.

There has been shown, therefore, an improved digital timing circuit. The disclosed circuit is versatile and can readily change from one mode of operation to another. The circuit can easily provide both interval and countdown timing in addition to providing fixed displays.

Various other changes and modifications may be made in the above described timing circuit without deviating from the spirit and scope of the present invention.

Various modifications of the features of the invention are set forth in the following claims.

What is claimed is:

1. An electrical timing circuit comprising time base means for providing a series of electrical pulses, one for each predetermined time interval, read-out means having a plurality of inputs, the energization of each input causing the display of a digit corresponding to the energized input, switching means responsive to said pulses and having two levels of contacts, one in each level being closed for each pulse applied to said switching means, said contacts in each level being closed in sequence for successive pulses applied to said switching means, means connecting the inputs of each of said read-out means to said levels in reverse orders, and selector means selectively energizing one of said levels, thereby providing digital displays which are a function of time and said selected levels.

2. An electrical timing circuit comprising a plurality of read-out means each having a plurality of inputs, the energization of each input causing the display of a digit corresponding to the energized input, synchronizing means for providing a plurality of first electrical pulses at predetermined time intervals, a plurality of switching means, one for each of said read-out means, each switching means being responsive to pulses applied thereto and having two levels of contacts, one in each level being closed for each pulse applied to said switching means, said contacts in each level being closed in sequence for successive pulses applied to said switching means, means connecting the inputs of the respective read-out means to the levels in reverse order, a first of said switching means responsive to said first pulses for providing a second pulse after a preselected number of first pulses are applied thereto, each succeeding switching means being responsive to the pulses provided by the previous switching means and providing an additional pulse after a preselected number of pulses are applied thereto, and selector means selectively energizing either one of said levels in each switching means, thereby providing digital displays which are a function of time and selected order.

3. An electrical timing circuit comprising a plurality of read-out means each having a plurality of inputs, the energization of each input causing the display of a digit corresponding to the energized input, synchronizing means for providing a plurality of first electrical pulses at predetermined time intervals, a plurality of switching means, one for each of said read-out means, each switching means being responsive to pulses applied thereto and having two levels of contact, one in each level being closed for each pulse applied to said switching means, said contacts in each level being closed in sequence for successive pulses applied to said switching means, means connecting the inputs of the respective read-out means to the contacts of the two levels of the associated switching means in reverse order, a plurality of manually operated contact means, one being provided for each read-out means and each having a series of contacts which are closed in sequence, means coupling said inputs of the respective read-out means to said series of contacts of the associated manually operated contact means in order, a first of said switching means responsive to said first pulses for providing a second pulse after a preselected number of first pulses are applied thereto, each succeeding switching means being responsive to the pulses provided by the previous switching means and providing an additional pulse after a preselected number of pulses are applied thereto and selector means selectively energizing either one of said levels in each switching means or the manually operated contact means, thereby providing digital displays which either are a function of time and selected order, or are manually preset.

4. An electrical timing circuit comprising time base means for providing a series of electrical pulses, one for each predetermined time interval, read-out means having a plurality of inputs, the energization of each input causing the display of a digit corresponding to the energized input, switching means responsive to said pulses and having two levels of contacts, one in each level being closed for each pulse applied to said switching means, said contacts in each level being closed in sequence for successive pulses applied to said switching means, reset means for applying pulses successively closing said contacts in each level until a preselected contact is closed, means connecting the inputs of said readout means to said levels in reverse orders, and selector means selectively energizing one of said levels, thereby providing digital displays which are a function of time and said selected levels.

5. An electrical timing circuit comprising time base means for providing a series of electrical pulses, one for each predetermined time interval, read-out means having a plurality of inputs, the energization of each input causing the display of a digit corresponding to the energized input, switching means responsive to said pulses and having two levels of contacts, one in each level being closed for each pulse applied to said switching means, said contacts in each level being closed in sequence for successive pulses applied to said switching means, reset means for applying pulses successively closing said contacts in each level until a preselected contact is closed, means connecting the inputs of said read-out means to said levels in reverse orders, and selector means selectively energizing either of said levels, thereby providing digital displays which are a function of time and said selected levels, and homing means connected to said reset means when said selector means energizes one of said levels for selectively determining said preselected contact.

6. An electrical timing circuit comprising a plurality of digital read-out units, each having ten inputs, one for each digit, the energization of each input causing display of the digit corresponding to the energized input, time base means for providing a plurality of first electrical pulses, one each second, said time base means including an electric motor for providing said first pulses by momentarily closing a normally open switch once each revolution, a first electrical circuit element, ten conductive segments, means responsive to said motor for sequentially connecting each said segment to said first electrical circuit element, means connecting the inputs of a first of said read-out units to said conductive segments in a predetermined order, a plurality of stepping switches, one for each additional read-out unit, each stepping switch having at least two levels of contacts and a solenoid, each said solenoid responsive to each pulse applied thereto for closing one contact in every level, said contacts being closed in sequence for successive pulses applied to said solenoid, means connecting the inputs of each read-out means to the contacts on two of said levels of a respective stepping switch in reverse order, a first of said stepping switches responsive to said first pulses for momentarily closing an associated normally open switch to provide an additional pulse after a selected number of first pulses are applied thereto, each succeeding stepping switch being responsive to said additional pulses provided by a preceding stepping switch for momentarily closing an associated normally open switch to provide another pulse after a selected number of additional pulses applied thereto, a plurality of manually operated preset switches, one for each read-out unit and each having a series of contacts, means coupling the inputs of each read-out unit to the contacts of a preset switch, reset means for applying a plurality of pulses to said solenoids until a preselected contact on each switch is closed, and a selector switch selectively coupling said first conductive element and levels on each stepping switch or said preset switches to an energizing means for providing forward timing, reverse timing or a preset display.

7. An electrical timing circuit comprising a plurality of digital read-out units, each having ten inputs, one for each digit, the energization of each input causing display of the digit corresponding to the energized input, time base means for providing a plurality of first electrical pulses, one each second, said time base means including an electric motor for providing said first pulses by momentarily closing a normally open switch once each revolution, a first electrical circuit element, ten conductive segments, means responsive to said motor for sequentially connecting each said segment to said first electrical circuit element, means connecting the inputs of a first of said read-out units to said conductive segments in a predetermined order, a plurality of stepping switches, one for each additional readout unit, each stepping switch having at least two levels of contacts and a solenoid, each said solenoid responsive to each pulse applied thereto for closing one contact in every level, said contacts being closed in sequence for successive pulses applied to said solenoid, means connecting the inputs of each read-out means to the contacts on two of said levels of a respective stepping switch in reverse order, a first of said stepping switches responsive to said first pulses for momentarily closing an associated normally open switch to provide an additional pulse after a selected number of first pulses are applied thereto, each succeeding stepping switch being responsive to said additional pulses provided by a preceding stepping switch for momentarily closing an associated normally open switch to provide another pulse after a selected number of additional pulses applied thereto, a plurality of manually operated preset switches, one for each read-out unit and each having a series of contacts, means coupling the inputs of each read-out unit to the contacts of a preset switch, reset means for applying a plurality of pulses to said solenoids until a preselected contact on each switch is closed, a selector switch selectively coupling said first electrical circuit element and one of said levels on each stepping switch or said preset switches to an energizing means for providing forward timing, reverse timing or a preset display, and homing means connected to said reset means when said selector means energizes one of said levels for selectively determining said preselected contact.

8. An electrical timing circuit as set forth in claim 4 which further includes a manually operated contact means having a series of contacts which are closed in sequence, and means coupling said inputs of said read-out means to said last mentioned series of contacts in order, and said selector means selectively energizes one of said levels of said manually operated contact means, whereby either forward or reverse timing may be selected or a preset display may be provided.

References Cited by the Examiner

UNITED STATES PATENTS

| | | | |
|---|---|---|---|
| 889,533 | 6/1908 | Maas | 340—309.6 |
| 1,096,779 | 5/1914 | Clement. | |
| 1,999,810 | 4/1935 | Hershey | 340—334 X |
| 2,346,869 | 4/1944 | Poole | 340—168 |
| 2,451,489 | 10/1948 | Joel | 340—168 |
| 2,947,803 | 8/1960 | Hanley. | |
| 2,958,179 | 11/1960 | Wolfe. | |
| 2,987,711 | 6/1961 | Palmer | 340—379 X |
| 3,041,596 | 6/1962 | Caferro | 340—309.6 X |
| 3,113,204 | 12/1963 | O'Brien | 340—168 X |
| 3,120,652 | 2/1964 | Weighton | 340—309.1 X |
| 3,181,134 | 4/1965 | Le Saint | 340—334 X |

FOREIGN PATENTS

| | | |
|---|---|---|
| 426,559 | 4/1935 | Great Britain. |
| 466,861 | 6/1937 | Great Britain. |

NEIL C. READ, *Primary Examiner.*

R. M. GOLDMAN, *Assistant Examiner.*